Dec. 12, 1961   R. F. WOODY ET AL   3,012,575
TRANSFER VALVE
Filed Nov. 3, 1958   2 Sheets-Sheet 1
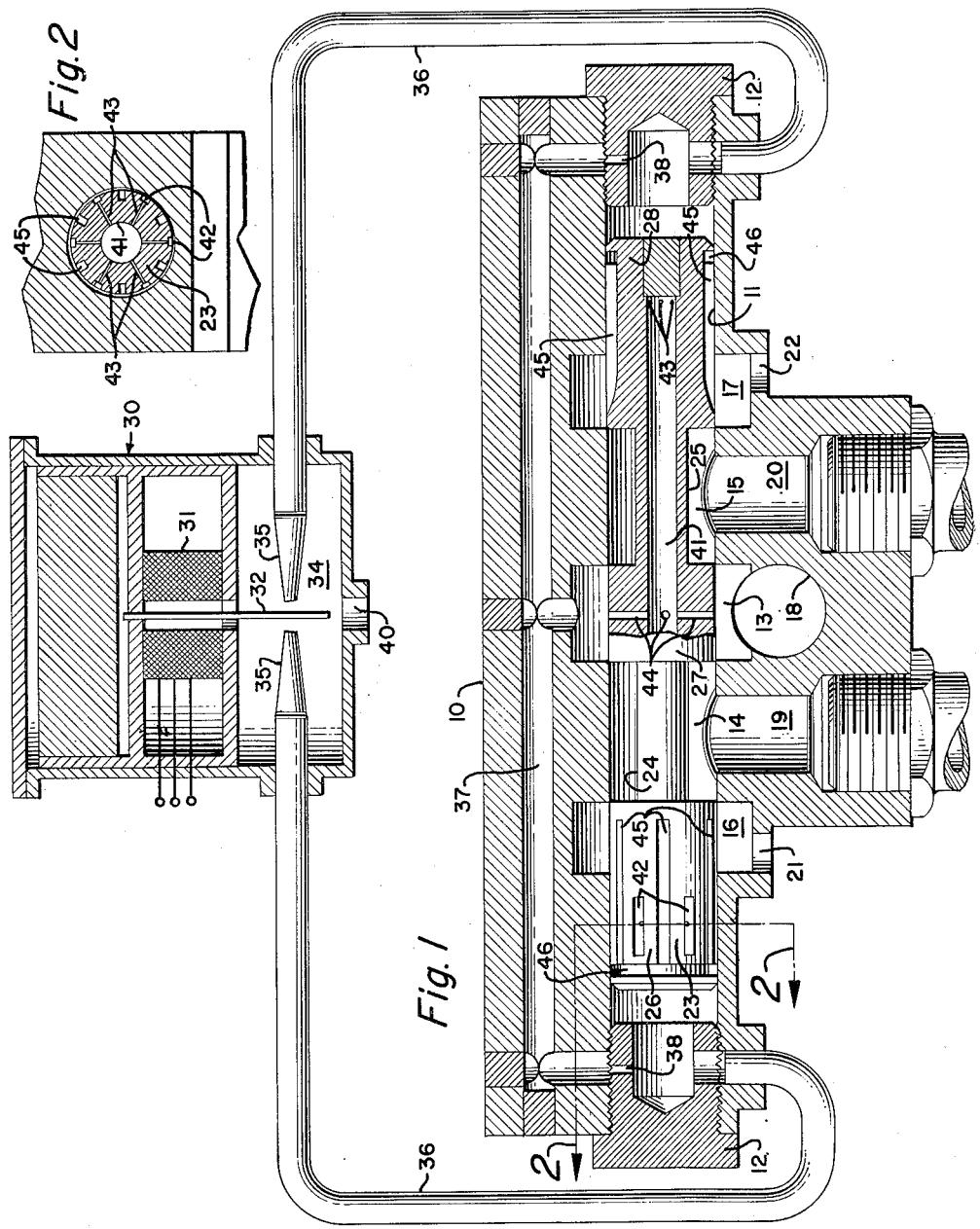
INVENTORS
LEE D. SCHMID
ROBERT F. WOODY
BY
Herschel C. Omohundro
ATTORNEY Dec. 12, 1961  R. F. WOODY ET AL  3,012,575
TRANSFER VALVE
Filed Nov. 3, 1958  2 Sheets-Sheet 2
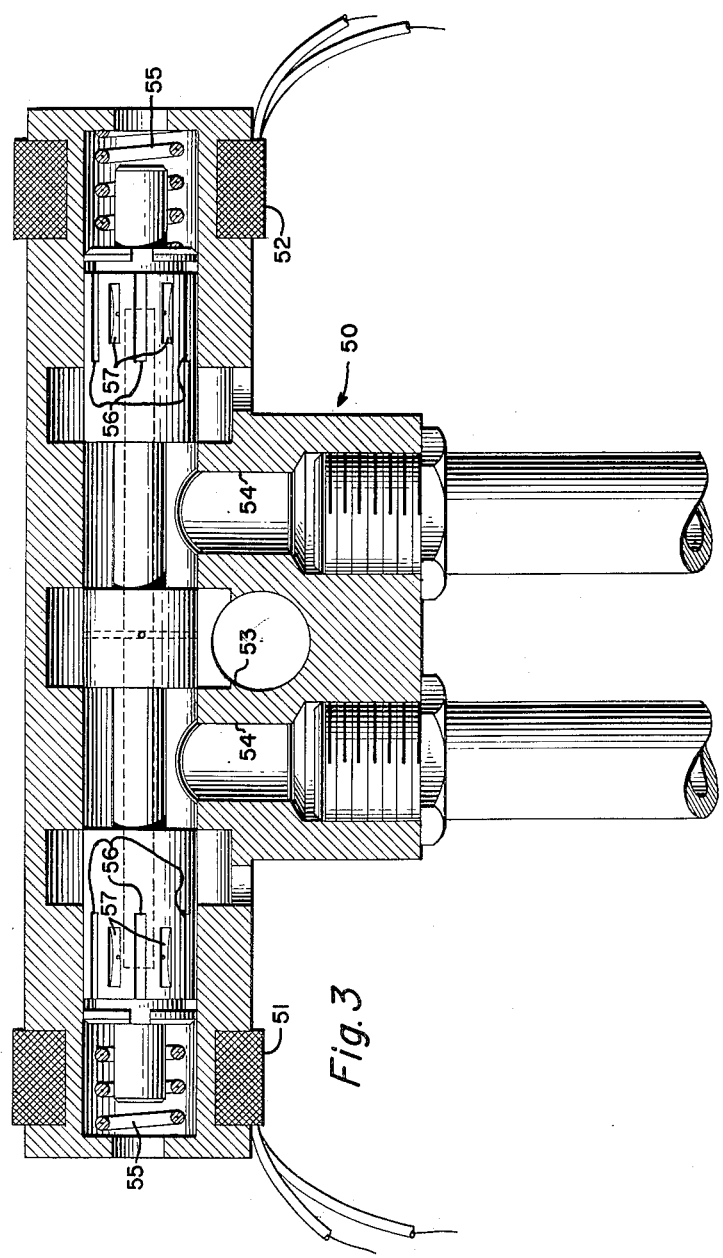
INVENTORS
LEE D. SCHMID
ROBERT F. WOODY
BY
Herschel C. Omohundro
ATTORNEY

United States Patent Office 3,012,575
Patented Dec. 12, 1961

3,012,575
TRANSFER VALVE
Robert F. Woody and Lee D. Schmid, Phoenix, Ariz., assignors to The Garrett Corporation, Los Angeles, Calif., a corporation of California
Filed Nov. 3, 1958, Ser. No. 771,332
11 Claims. (Cl. 137—622)

This invention relates generally to valves and more particularly to valves of the type having a body with a chamber in which a spool is disposed for reciprocation between positions wherein communication is established between certain ports in the body. The invention is still more particularly directed to fluid control or transfer valves which are actuated by fluid pressure differentials and are designed for use in locations exposed to such high temperatures that normal lubricating mediums fail.

An object of this invention is to provide a fluid transfer valve having means for applying fluid under pressure to selected parts of the valve to facilitate the support and movement of one or more of such parts.

Another object of this invention is to provide a fluid transfer valve having a ported casing element and a spool element for controlling communication between the ports in the casing, one of the elements being formed to apply fluid under pressure to opposed surfaces of such elements to maintain them in as friction-free movable relation as possible.

A further object of the invention is to provide a pneumatic transfer valve having a casing element formed with a bore and pressure inlet, motor and exhaust ports spaced longitudinally of the bore, a valve spool element being disposed for movement axially of the bore to control communication between the ports, one of the elements having recesses or pockets for receiving pneumatic fluid under pressure, the fluid tending to flow between the opposed surfaces of the spool and casing element and exert forces thereon to prevent frictional contact between the elements whereby the spool may be quickly and easily moved even when the transfer valve is exposed to high temperatures and devoid of any lubrication other than the pneumatic fluid.

A still further object of the invention is to provide the pneumatic transfer valve referred to in the preceding paragraph with a spool having the recesses or pockets mentioned formed in the surface of the spool and connected by passages with the inlet port of the valve casing, relief grooves being formed between adjacent recesses and communicating at all times with an exhaust port to provide for a continuous but minute flow of fluid from the recesses across the surfaces between the recesses and grooves, which flow will prevent localized accumulation of pressure and consequent bind of the spool in the casing bore.

Another object is to provide the spool mentioned in the preceding paragraphs with equally spaced recesses of restricted length, so that the recesses will at all times be prevented from communicating directly with an exhaust port, thus maintaining a film of pressure fluid between the spool and casing on which the former will float for friction-free movement; the equal spacing of the recesses provides for the centering of the spool in the bore, due to the tendency of pressure to increase on the side of the spool disposed in closer relationship to the bore wall and decrease on the opposite side.

Other objects and advantages will be apparent from the following description of different forms of the invention which have been disclosed in detail in the accompanying drawing, wherein:

FIGURE 1 is a schematic view partly in section showing a fluid transfer valve formed in accordance with the invention and arranged in an operating circuit;

FIG. 2 is a vertical transverse sectional view taken on the plane indicated by the line 2—2 of FIG. 1; and FIG. 3 is a schematic view partly in section showing a fluid transfer valve of a slightly different form.

The first valve selected for illustration and to which the invention has been adapted is one employing the well-known acceleration switching technique. The operation of such a valve is controlled by a torque motor to which electrical signals are applied. While such a valve has been illustrated in greater detail in the drawing, it should be obvious that the invention is applicable to valves operated in other ways, such as by solenoid, as in the valve shown in FIG. 3.

In FIG. 1 of the drawing, the numeral 10 designates the valve body or casing. Such casing may be formed in any suitable manner from suitable materials. The casing includes a main bore 11 which extends longitudinally of the casing and is closed at its ends by plugs 12 secured in the casing in any well-known manner. The casing also includes a plurality of chambers 13 to 17, inclusive, spaced longitudinally of the bore and constituting inlet, motor, and exhaust chambers which communicate with the exterior of the casing through suitable ports 18 to 22, inclusive. These ports may be formed in any conventional manner for connection, depending upon their function, with passages extending to a fluid pressure source, a motor, or the ambient atmosphere or other exhaust. Port 18 communicates directly with chamber 13 and constitutes the inlet port through which air or other fluid under pressure may be supplied to the valve bore. Ports 19 and 20 communicate directly with chambers 14 and 15, respectively, and are connected by suitable passages with a fluid motor of any desired type (not shown). Ports 21 and 22, in the form of the invention illustrated, connect with chambers 16 and 17 and communicate with the ambient atmosphere, the valve shown being a pneumatic valve which may exhaust to atmosphere without deleterious effects. If other fluids are employed to operate the motor governed by the valve, the exhaust ports may be connected with a reservoir for collecting and recirculating the operating fluid.

Bore 11 is formed to receive for longitudinal sliding movement a spool element 23, this element having a pair of annular grooves 24 and 25 formed therein, the grooves separating lands or heads 26, 27 and 28. The spool is movable between various positions in which communication will be established by the grooves 24 and 25 between certain sets of chambers 13 to 17, inclusive, in one position the inlet chamber 13 being connected with one motor port and the other motor port being connected with an exhaust port.

To effect movement of the spool in the casing, a torque motor, designated generally by the numeral 30, has been schematically illustrated. This torque motor includes a winding 31 and an armature 32, the latter being in the form of a vibratory reed, one end of which projects into a chamber 34 between the spaced ends of a pair of nozzles 35. These nozzles are connected by passages 36 with opposite ends of the bore 11. The ends of the bore are also connected by a passage 37 with the inlet port or chamber 13, communication between the passage 37 and the ends of the bore being established through restricted openings 38. When fluid under pressure is supplied to the inlet chamber 13, some of the fluid will flow through passage 37 and restricted ports 38 to the ends of the bore 11. This fluid will then flow through passages 36 to the chamber 34 and from this chamber through an outlet 40 to the ambient atmosphere. The current supplied to the torque motor causes the reed 32 to vibrate between the spaced nozzles 35 to restrict the flow of fluid from the passages 36 into the chamber 34. If the reed vibrates at a uniform rate, the same quantity of fluid will be permitted to flow from each nozzle 35 and the pressures at opposite ends of the bore 11 will be equalized. The spool will then remain in a centrally located position, illustrated in FIG. 1, in which no flow from the inlet port to either motor port will take place. If a signal transmitted to the torque motor causes the reed to vibrate in such a manner that it offers more restriction to the flow from one nozzle 35 than from the other, the pressures at opposite ends of the bore 11 will become unequal and the spool will be moved in response to the differential to establish communication between the inlet port 13 and one motor port and between the other motor port and exhaust. The fluid motor controlled by the valve will then be caused to operate in one direction. A proper signal transmitted to the torque motor will effect a reversal of this condition.

The foregoing construction and operation is well-known and no claim thereto is made in this application.

To facilitate the movement of the spool in the casing without the use of conventional lubricating mediums, the outer surface of the spool is finished to a diameter which will provide a predetermined clearance between the external surface of the spool and the surface of the bore. The spool is also provided with an internal passage 41. The end lands or heads of the spool are formed with circumferentially spaced, longitudinally extending recesses 42 which communicate with the internal passage 41 by small ports 43, the passage 41 also being in communication with chamber 13 through ports 44.

FIG. 2 shows that the recesses 42 are uniformly spaced around the spool and open to the exterior surface thereof. When fluid is introduced to the inlet port of the casing, some of this fluid will flow through the ports 44, passage 41, and ports 43 to the recesses 42. This fluid will exert pressure over the areas of the recesses against the adjacent surfaces of the bore 11, fluid tending to seep between the surfaces of the bore and spool and flow around the latter. To prevent a localized accumulation of forces, the spool is provided between adjacent recesses 42 with longitudinally extending grooves 45 which are of such length that they communicate at all times with the adjacent exhaust chamber. The ends of the grooves 45 adjacent the ends of the spool are connected by annular grooves 46 formed in the surface of the spool. The fluid under pressure which tends to seep from the recesses 42 will flow into the grooves 45 and escape therefrom through the respective exhaust ports. If gravity or other external force tends to move the spool toward one side of the bore, the fluid pressure, in the recesses 42 and between adjacent surfaces at the opposite side of the spool, will decrease; consequently, the pressure at the first side will oppose the external force and move the spool back toward a central position in the bore. The fluid escaping from the recesses provides a film on which the spool floats and the movement of the spool is thus facilitated.

It is obvious that the recesses 42 and grooves 45 could be formed in the surfaces of the bore rather than in the spool without changing the principle of operation. It should also be obvious that the shapes and areas of the recesses 42 could be changed without departing from the principles involved.

From the foregoing description and the drawing, it will be evident that since the spool is supported on a film of air or other fluid, it will move freely in response to slight pressure differences at opposite ends thereof. It will also be evident that the spool may be moved in the flow-controlling operations by means other than fluid pressure differentials at opposite ends. For example, a valve 50 has been shown schematically in FIG. 3, in which solenoids 51 and 52 have been provided to effect the movement of the spool to establish communication between the inlet port 53 and one or the other of the motor ports 54. In this form of valve the spool is returned to a centered, motor-stopping position by coil springs 55 disposed at the ends of the spool. Any suitable switch means may be provided to control the flow of current from a source to the solenoid coils. In valve 50 the ends of the bore are open to the ambient atmosphere, and the relief grooves 56 between the recesses 57 merely open to the ends of the spool. In the modified form of the invention, fluid under pressure is supplied to the recesses 57 and exerts forces to support the spool on a film of fluid in the same manner as in the form of the invention first described. It should be obvious that the fluid pressure used for the support of the spool in either or both forms of the invention could be taken from a source independent of that used to operate the motor or other device controlled by the valve. The use of a separate source may be desirable in the event the fluid employed to effect motor operation has characteristics which might make it undesirable to permit the fluid to discharge to the atmosphere.

While the invention has been illustrated in two forms only, it is obvious that many minor changes in construction and relation of parts could be made without departing from the spirit and scope of the invention.

We claim:

1. In a fluid transfer valve: a casing having a bore with spaced inlet, motor and exhaust ports communicating therewith; a spool member with relieved portions disposed for sliding movement in said bore to control communication between certain of said ports, said casing and spool having opposed relatively movable surfaces certain of which are provided with fluid pressure receiving recesses in restricted communication at all times with a source of fluid pressure, said recesses being spaced at all times from said ports, certain of said surfaces being provided with relief grooves between said recesses and communicating with an exhaust region at all times; and means for applying longitudinally directed forces to said spool to effect fluid control movement thereof.

2. In a fluid transfer valve: a casing having a bore with spaced inlet, motor and exhaust ports communicating therewith; a spool member with relieved portions disposed for sliding movement in said bore to control communication between certain of said ports, said casing and spool having opposed relatively movable surfaces certain of which are provided with fluid pressure receiving recesses in restricted communication at all times with said inlet port, said recesses being spaced at all times from said motor and exhaust ports, certain of said surfaces being provided with relief passages in spaced relation from said recesses and communicating at all times with an exhaust region; and means for applying longitudinally directed forces to said spool to effect fluid control movement thereof.

3. In a fluid transfer valve: a casing having a bore with spaced inlet, motor and exhaust ports communicating therewith; a spool member with relieved portions disposed for sliding movement in said bore to control communication between certain of said ports, said casing and spool having opposed relatively movable surfaces certain of which are provided with fluid pressure receiving recesses in restricted communication at all times with a source of fluid pressure, said recesses being spaced at all times from said ports, certain of said surfaces being provided with relief passages in spaced relation from said recesses and communicating at all times with an exhaust region; and electrically controlled means for applying longitudinally directed forces to said spool to effect fluid control movement thereof.

4. In a transfer valve: a casing having a bore with closed ends and longitudinally spaced inlet, motor and exhaust ports communicating therewith; a spool member with relieved portions disposed for sliding movement in said bore to control communication between certain of said ports, said casing and spool having opposed relatively movable surfaces adjacent the end portions of said spool, certain of said surfaces being provided with fluid pressure receiving recesses in restricted communication at all times with said inlet port, said recesses being spaced at all times from said exhaust ports, certain of said surfaces being provided with relief grooves disposed between said recesses, said relief grooves communicating with said exhaust ports at all times.

5. A transfer valve comprising: a casing forming an elongated bore with closed ends and inlet, motor and exhaust ports communicating with said bore at locations spaced longitudinally thereof; a spool member disposed for longitudinal reciprocation in said bore, said spool member having spaced grooves operative in certain positions of said spool to establish communication between the inlet and a motor port and between another motor port and an exhaust port, said spool having piston heads at opposite ends, each of said piston heads having an annular groove adjacent the outer end and circumferentially spaced grooves extending longitudinally from said annular grooves, said longitudinal grooves communicating at all times with the adjacent exhaust port, said piston heads being provided with a recess between adjacent longitudinal grooves, the length and width of said recesses being limited to prevent direct communication thereof at any time with said exhaust ports and grooves, said spool member having passages for conducting fluid under pressure from said inlet port to said recesses at all times.

6. A transfer valve comprising: a casing forming an elongated bore with closed ends and inlet, motor, and exhaust ports communicating with said bore at locations spaced longitudinally thereof; a spool member disposed for longitudinal reciprocation in said bore, said spool member having longitudinally spaced relieved portions operative in certain positions of said spool to establish communication between the inlet and a motor port and between another motor port and an exhaust port, a plurality of alternately arranged longitudinally extending circumferentially spaced recesses and relief grooves being formed in the surface of said spool member adjacent each end, said recesses being restricted in length to prevent communication thereof in all positions of said spool member with any of said ports, said relief grooves being of a length sufficient to communicate with said exhaust ports at all times, said spool member having passages establishing communication between said inlet port and said recesses; and means for creating pressure differences in said bore at the ends of said spool to effect movement thereof.

7. A transfer valve comprising: a casing forming an elongated bore with closed ends and inlet, motor, and exhaust ports communicating with said bore at locations spaced longitudinally thereof; a spool member disposed for longitudinal reciprocatory movement in said bore, said spool member having longitudinally spaced relieved portions operative in certain positions of said spool to establish communication between the inlet and a motor port and between another motor port and an exhaust port, a plurality of longitudinally extending circumferentially spaced recesses being formed in the surface of said spool adjacent each end, said recesses being of restricted length to prevent communication thereof at any time with any of said ports, said spool having relief grooves spaced from said recesses and communicating with said exhaust ports at all times, said spool having passages establishing communication between said inlet port and said recesses; and means for creating pressure differences in said bore at the ends of said spool to effect movement thereof.

8. A transfer valve comprising: a casing forming an elongated bore with closed ends and a plurality of ports communicating with said bore at locations spaced longitudinally thereof, a first port disposed intermediate the ends of said bore constituting an inlet port and receiving fluid under pressure from a source thereof, ports at either side of said first port constituting working ports and being arranged to communicate with power utilizing apparatus, and additional ports serving as exhaust ports and being disposed on the opposite side of said working ports from said inlet port; spool means disposed in said bore for reciprocatory movement, said spool having longitudinally spaced relieved portions operative in certain positions of said spool to establish communication between predetermined ports in said casing, portions of said spool adjacent the ends thereof being formed with circumferentially spaced longitudinally extending recesses, certain recesses being of restricted length and others being of a length sufficient to communicate with said exhaust ports at all times, said spool having passages establishing communication between said inlet port and the recesses of restricted length.

9. In a fluid transfer valve: a casing having a bore with spaced inlet, motor and exhaust ports communicating therewith; a spool member with relieved portions disposed for sliding movement in said bore to control communication between certain of said ports, said casing and spool having opposed relatively movable surfaces, certain of which are provided with fluid pressure receiving recesses in restricted communication at all times with a source of fluid pressure, said recesses being spaced at all times from said ports, certain of said surfaces being provided with relief grooves between said recesses and spaced predetermined distances therefrom, said relief grooves communicating with an exhaust region at all times; and means for applying longitudinally directed forces to said spool to effect fluid control movement thereof.

10. In a fluid transfer valve: a casing having a bore with spaced inlet, motor and exhaust ports communicating therewith; a spool member with relieved portions disposed for sliding movement in said bore to control communication between certain of said ports, said casing and spool having opposed relatively movable surfaces, certain of which are provided with fluid pressure receiving recesses in restricted communication at all times with a source of fluid pressure, said recesses being spaced at all times from said ports, certain of said surfaces being provided with relief grooves between said recesses and spaced equidistantly therefrom, said relief grooves communicating with an exhaust region at all times; and means for applying longitudinally directed forces to said spool to effect fluid control movement thereof.

11. In a fluid transfer valve: a casing having a bore with spaced inlet, motor and exhaust ports communicating therewith; a spool member with relieved portions disposed for sliding movement in said bore to control communication between certain of said ports, said casing and spool having opposed relatively movable surfaces, certain of which are provided with fluid pressure receiving recesses in restricted communication at all times with a source of fluid pressure, said recesses being spaced at all times from said ports, certain of said surfaces being provided with relief grooves between said recesses and spaced predetermined distances therefrom, one of said surfaces also being provided with a relief groove at at least one end of said pressure receiving recesses, said relief grooves communicating with an exhaust region at all times; and means for applying longitudinally directed forces to said spool to effect fluid control movements thereof.

References Cited in the file of this patent

UNITED STATES PATENTS 2,615,466    Garde  ---------------- Oct. 28, 1952
2,709,421    Avery  ---------------- May 31, 1955